WITNESSES
Theodore T. Wrobel
James T. Young

INVENTOR
Edmond Bateman
BY
Willard R. Crout
ATTORNEY

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966 10 Sheets-Sheet 3

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966 10 Sheets-Sheet 4

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966

10 Sheets-Sheet 5

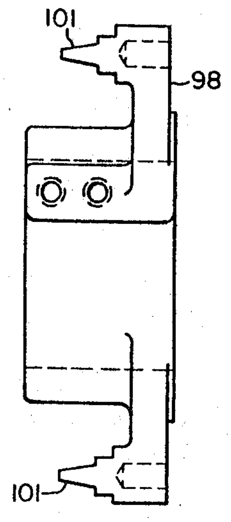
FIG.16.
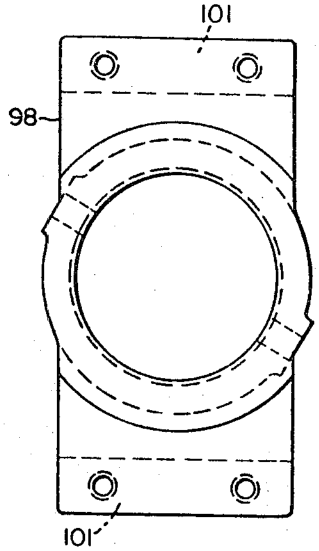
FIG.17.
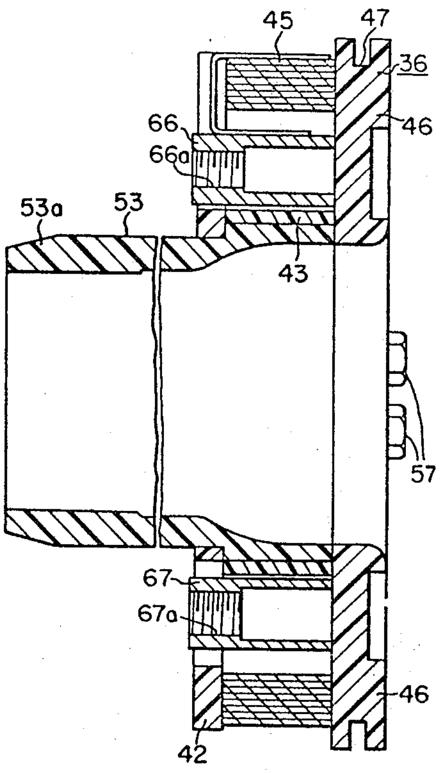
FIG.18.
FIG.19.
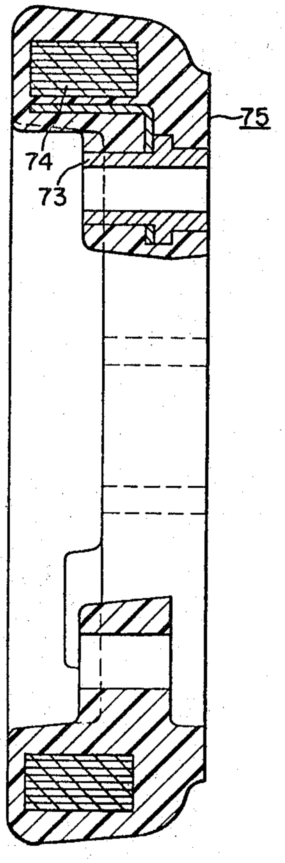
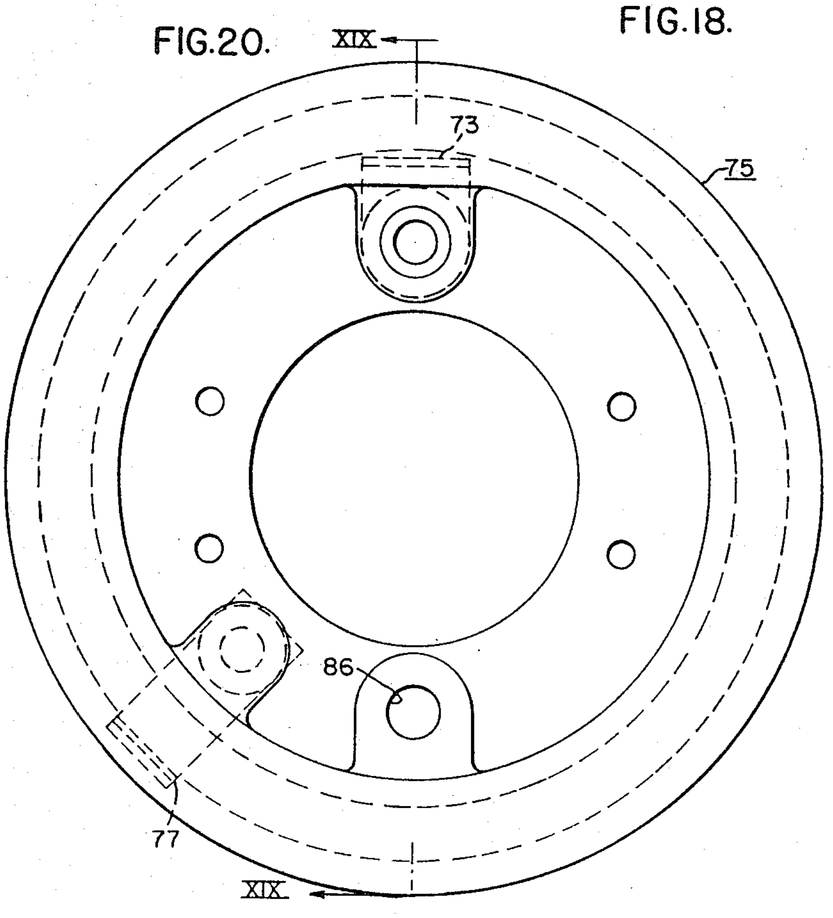

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966

10 Sheets-Sheet 8

Sept. 29, 1970 E. BATEMAN 3,531,608

FLUID-BLAST CIRCUIT INTERRUPTER WITH PISTON ASSEMBLY AND ELECTROMAGNETIC DRIVING MEANS INCLUDING THREE COILS

Filed Sept. 29, 1966 10 Sheets-Sheet 9

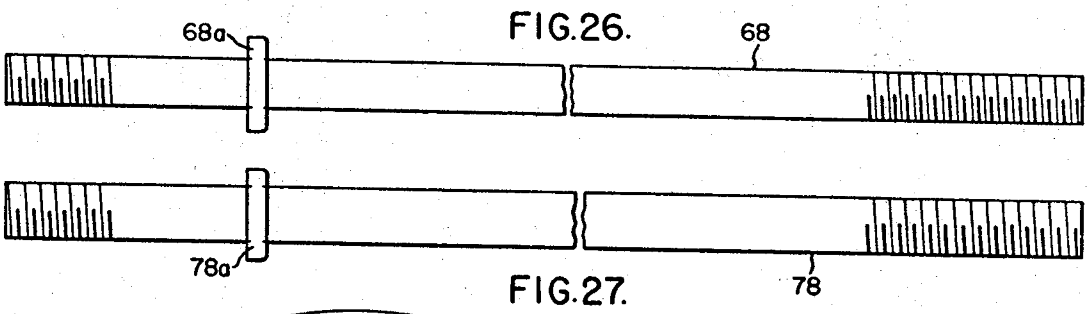
FIG.26. FIG.27.
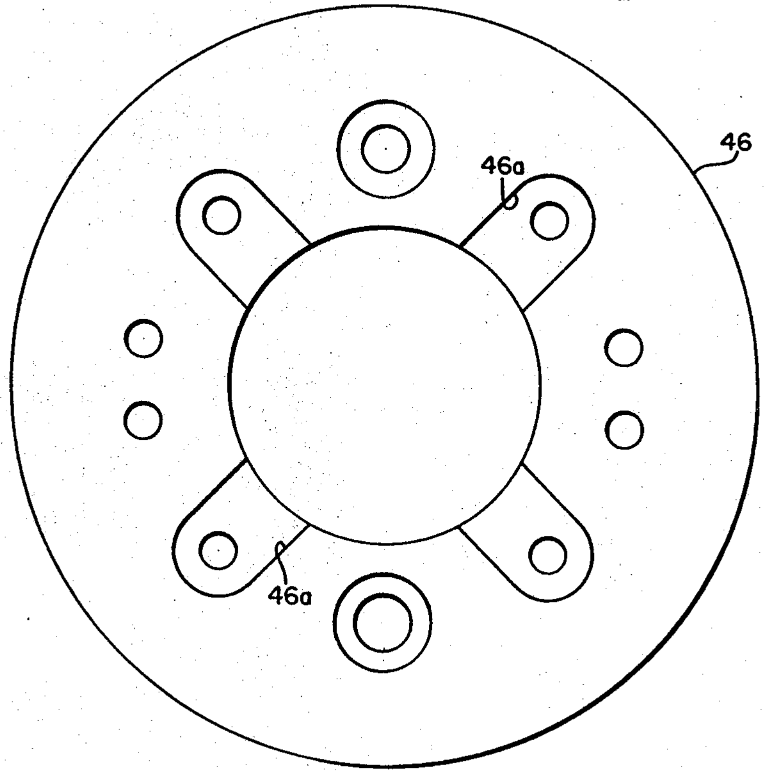
FIG.28.
FIG.30.
FIG.29.
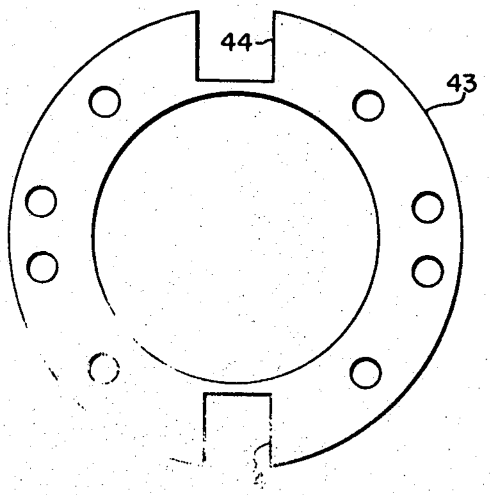
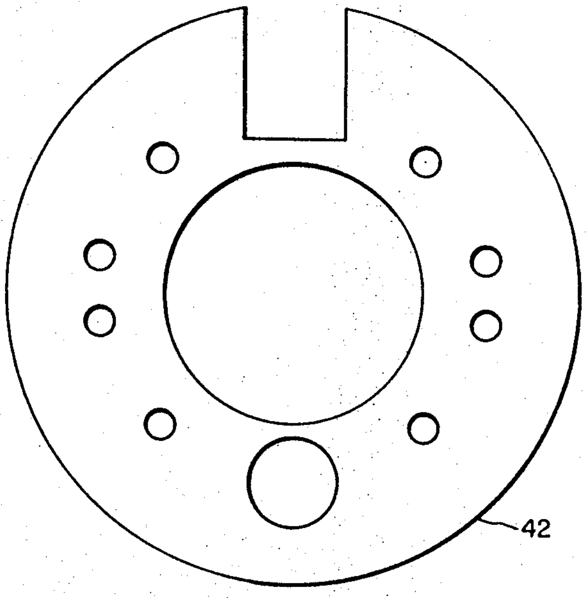

United States Patent Office 3,531,608
Patented Sept. 29, 1970

3,531,608
FLUID-BLAST CIRCUIT INTERRUPTER WITH PISTON ASSEMBLY AND ELECTROMAGNETIC DRIVING MEANS INCLUDING THREE COILS

Edmond Bateman, Glasgow, Scotland, assignor to Westinghouse Electric Corporation, Pittsburgh, Pa., a corporation of Pennsylvania Filed Sept. 29, 1966, Ser. No. 582,925
Int. Cl. H01h 33/82
U.S. Cl. 200—148 7 Claims

ABSTRACT OF THE DISCLOSURE

A fluid-blast circuit interrupter of the piston type is provided having three accelerating coils, instead of two, for more uniformly grading the magnetic impulse force throughout the length of the piston stroke. The movable piston member, carrying the movable contact structure, additionally carries a movable accelerating coil. The base portion of the stationary operating cylinder supports a stationary accelerating coil. A driver unit, carrying a second movable accelerating coil, wound in magnetic opposition to the aforesaid two accelerating coils, is attached to, and movable with the piston assembly to thereby accelerate the same. Insertion of the three accelerating coils serially into the series circuit is achieved by fluid blast action to a movable arcing horn constituting a portion of the movable contact assembly.

This invention relates generally to fluid-blast circuit interrupters, and, more particularly, to fluid-blast circuit interrupters of the type having a piston assembly associated therewith and actuated by electromagnetic means for generating fluid under pressure to be forced into the established arc to effect the extinction thereof.

As well known by those skilled in the art, the general trend in metal-clad switchgear over the past decade has been to higher voltages and to higher interrupting ratings. In 1955, approximately 80% of the production of a large electrical company was 5 kv. switchgear. In 1965, for example, the same manufacturer accounted for only 47% of his total switchgear production in 5 kv. units. In addition to this general trend to higher voltage switchgear, the trend has been to higher interrupting ratings for circuit breakers. Up until 1957, the highest interrupting rating available in metal-clad switchgear was 500 mva. In that year, the first 750 mva. breakers were made available. In 1958, metal-clad switchgear with 1000 mva. breakers were made available. Currently, in 1966, 34.5 kv. metal-clad switchgear with breakers having an interrupting capacity of 1500 mva. are now for the first time available.

The first requirement for any line of switchgear is a reliable circuit breaker. Various types of interrupters have been proposed. However, to increase the voltage and interrupting ratings, it has been proposed to use puffer-type structures. Basically, the puffer concept is not new. It consists essentially of a pair of separable contacts, a piston and a cylinder all mounted in a reservoir containing a suitable arc-interrupting gas. The contacts and piston are mounted in such a way that as the contacts are parted, the piston moves to drive the gas in the cylinder through the arc to interrupt it. Such devices were investigated as long as twenty years ago using the then-available interrupting gases. A moderate degree of success was attained at that time. However, the devices were too inefficient to warrant further development.

The discovery of the ability of sulfur-hexafluoride ($SF_6$) gas to interrupt an arc gave the puffer interrupter a new boost, and the first commercial application of the puffer interrupter was a load-break disconnecting switch capable of switching load currents at voltages up through a 161 kv. on a single break.

Following this, a series of prototype puffer interrupters were built with the final one being capable of interrupting 50,000 amperes at 22 kv. across a single break. However, the back-pressure in the operating cylinder created by the arc required a piston-driving force of 10,000 to 12,000 pounds for interruption of the highest currents. This would require too large a mechanism to make this a practical breaker. At this point in the development period, the discovery was to use a magnetic puffer. This would provide a good interrupter, and the power to operate it would not be too great. It was proposed to use the short-circuit current to drive the piston. Experience with magnetic air circuit breakers has shown the tremendous force vailable from coils carrying fault current. It was proposed to shunt this current into coils and let them do the work mechanically driving the piston.

A series of calculations was made to determine what force could be obtained from coils carrying high current. The calculations were based on a system of 3–10 inch diameter 10-turn coils arranged for attraction and repulsion over a 7 inch stroke. These calculations showed that a 21,000 ampere short-circuit current through these coils would produce a force of 12,100 pounds at the beginning of the stroke. A 42,000 ampere short would produce a force of 48,000 pounds. The discovery was made that here was a means of obtaining the high force required to drive the piston for the circuit interrupter. Accordingly, a general object of the present invention is to provide an improved fluid-blast circuit interrupter having magnetic means including at least three accelerating coils serially connected into the electrical circuit, and taking advantage of the short-circuit energy to improve the fluid-blast operation of the interrupter.

Another object of the present invention is to provide an improved fluid-blast type of circuit interrupter having improved piston-operated means associated therewith, and electromagnetic driving means including at least there accelerating coils to assist in the operation of said piston means.

Another object of the present invention is the provision of an improved fluid-blast circuit interrupter having highly effective piston-moving means and fluid-directing means associated therewith.

Still a further object of the present invention is the provision of an improved fluid-blast circuit interrupter of compact size, and operating a high a highly-efficient manner to quickly generate the required amount of high-presure fluid, such as gas, and to effectively direct the gas under high pressure toward the established arc to effect circuit interruption.

In United States patent application filed Sept. 1, 1966, Ser. No. 576,616, by Russell E. Frink, and assigned to the assignee of the instant application, there is illustrated and described a novel fluid-blast circuit interrupter having piston means associated therewith, which is assisted by an electromagnetic driving means, which is inserted into the series electrical circuit during the opening operation. It is a further object of the present invention to improve the interrupting circuit interrupter of the aforesaid patent application rendering it of highly-efficient operation and of compact dimensions.

In United States patent application filed Sept. 1, 1966, Ser. No. 576,739 by Russell E. Frink, and assigned to the assignee of the instant application, there is illustrated and described a novel fluid-blast circuit interrupter incorporating piston means assisted by an electromagnetic driving structure including a pair of accelerating coils, and utilizing arcing-horn means to effect arc transfer, and consequent insertion of the two accelerating coils into the circuit during the opening operation. It is a further object of the present invention to improve upon the transfer-arcing means of the aforesaid patent application to provide an improved fluid-blast circuit interrupter of highly-efficient operation and operable in a very short span of time, such, for example, as three cycles.

In United States patent application filed Sept. 1, 1966, Ser. No. 576,707, by William H. Fischer, and assigned of the instant application, there is disclosed movable arcing-horn means for effectively inserting electromagnetic means, including a pair of accelerating coils, into the electrical circuit to augment the piston-driving effect of an associated fluid-moving means. It is still a further object of the present invention to improve upon the movable arcing-horn means of the aforesaid Fischer application to provide an improved circuit interrupter of compact and highly-efficient construction.

In United States patent application filed Sept. 1, 1966, Ser. No. 576,583 by William H. Fischer, and assigned to the assignee of the instant application, there is described and claimed a novel fluid-blast circuit interrupter using novel venting-arcing horn arrangements for inserting the electromagnetic means serially into the circuit to assist the piston-driving effort of an associated fluid-moving means for rapid circuit interruption. It is still a further object of the present invention to improve upon the vented arcing-horn means of the aforesaid Fischer application to provide an improved and highly-effective circuit interrupter suitable for widespread commercial application.

As well known by those skilled in the art, a fluid-blast circuit interrupter utilizing piston means for fluid-pressure generation, and a subsequent forcing of the fluid under pressure into the established arc, the mechanical effort required of the operating mechanism becomes more severe during the interruption of high-amperage fault currents. If the mechanical driving effort is provided exclusively by the piston-operating arrangement, to accommodate high-current fault interruption, an extremely powerful operating mechanism is required. In an effort to reduce the power requirements imposed upon the associated operating mechanism, it is desirable to provide some means utilizing the energy in the associated electrical circuit to assist the mechanical requirements of the moving piston means during fault-current interruption. By so doing, it results that the power requirements of the operating mechanism may be held to a minimum. In other words, for low, or load-current interruption, the power supplied by the associated operating mechanism may be sufficient in itself to provide the desired piston-driving effort suitable for high-pressure gas generation. On the other hand, during heavy fault-current interruption, a desirable "assist" is provided by the electromagnetic means, as set forth in the present invention, as described hereinafter.

As set forth in United States patent application Ser. No. 576,616 if a pair of accelerating coils have the windings suitably arranged, there will be an attractive force set up between the two coils. On the other hand, the pair of coils may be so wound as to provide a repulsive force existing between the coils. It is a further object of the present invention to incorporate these attractive and repulsive magnetic forces collectively to assist in the fluid-driving effort of a piston assembly operated in conjunction with a fluid-blast circuit interrupter.

Another object of the invention is to provide an improved fluid-blast circuit interrupter having piston means associated therewith in which at least three accelerating coils using attractive and repulsive forces assist the fluid-compressing stroke of said piston means.

For a particular commercial circuit-interrupting application, rating factors which are required are as follows:

Nominal 3 phase volt-amperes—1500 mva.
Rated maximum voltage—38 kv.
Rated symmetrical short circuit current at maximum voltage—23 ka.
Maximum symmetrical short circuit current—38 ka.
Maximum asymmetry factor—1.2
Rated Interrupting time—3 cycles
1 minute 60 cycle withstand insulation level—80 kv.
Impulse withstand insulation level—150 kv.
Rated continuous currents—1200 and 3000 amps.

By incorporating novel electromagnetic means including at least three accelerating coils with a particular positioning and arrangement of the associated elements, it has been possible to meet the stringent requirements, as set forth above.

In accordance with a preferred embodiment of the invention, there is provided a stationary operating cylinder supported by terminal bushings within a surrounding metallic tank structure containing a suitable arc-extinguishing gas, such as sulfur-hexafluoride ($SF_6$) gas, as a pressure of say 75 p.s.i. One end of the aforesaid stationary operating cylinder is closed by a stationary piston head having a stationary accelerating coil encapsulated therein. Movable longitudinally within the stationary operating cylinder i: a movable piston assembly carrying the movable contact structure, the latter comprising an outer main tubular contact and an inner vented tubular arcing contact insulated from the outer tubular main contact. Associated with the movable piston assembly is a movable accelerating coil. Two guide rods mechanically interconnect the movable piston assembly through the closed end of the operating cylinder with a movable driving assembly, the latter comprising a movable repulsion coil. A stationary contact assembly is situated adjacent the open end of the stationary operating cylinder, and comprises a tubular main contact having disposed therewithin a tubular vented arcing contact having a tapered configuration for venting the arc gases. In addition, a movable nozzle insulating member moves over the stationary main contact with the movable piston assembly to effectively direct the compressed gas flow through the stationary tubular vented arcing contact, and also in an opposite direction through the vented tubular interiorly-located arcing tube. The arrangement is such that during the opening operation the main arc, established between the main contacts, is carried by the gas flow to impinge onto the movable vented arcing tube to thereby insert serially into the electrical circuit being interrupted the three accelerating coils. Thus, the initial mechanical movement of the movable piston assembly, as supplied by a conventional mechanism, is augmented and assisted by the electromagnetic driving means including a plurality of, such as three, accelerating coils inserted serially into the electrical circuit. This is particularly advantages during heavy fault-current interruption.

Further objects and advantages will readily become apparent upon reading the following specification taken in conjunction with the drawings, in which:

FIGS. 16 and 17 illustrate, respectively, side and front views of the movable rear main contact, which is threaded to the rear end of the main movable contact tube;

FIG. 18 is a vertical sectional view taken through the movable piston assembly with the contact structure omitted, and illustrating the terminals for the movable accelerating piston coil and the insulating nozzle member;

FIGS. 19 and 20 illustrate, respectively, in vertical section, and in end elevational view, the end moving driving accelerating, or repulsion coil for the interrupting element;

FIG. 26 is a side elevational view of the upper connecting rod for the movable piston assembly;

FIG. 27 is a side elevational view of the lower connecting rod for the movable piston assembly;

FIG. 28 is an end elevational view of the movable piston member;

FIG. 29 is an end elevational view of the insulating spaced element disposed interiorly of the movable piston accelerating coil; and FIG. 30 is an end elevational view of the front insulating clamping plate for the movable piston assembly;

Figure 1:
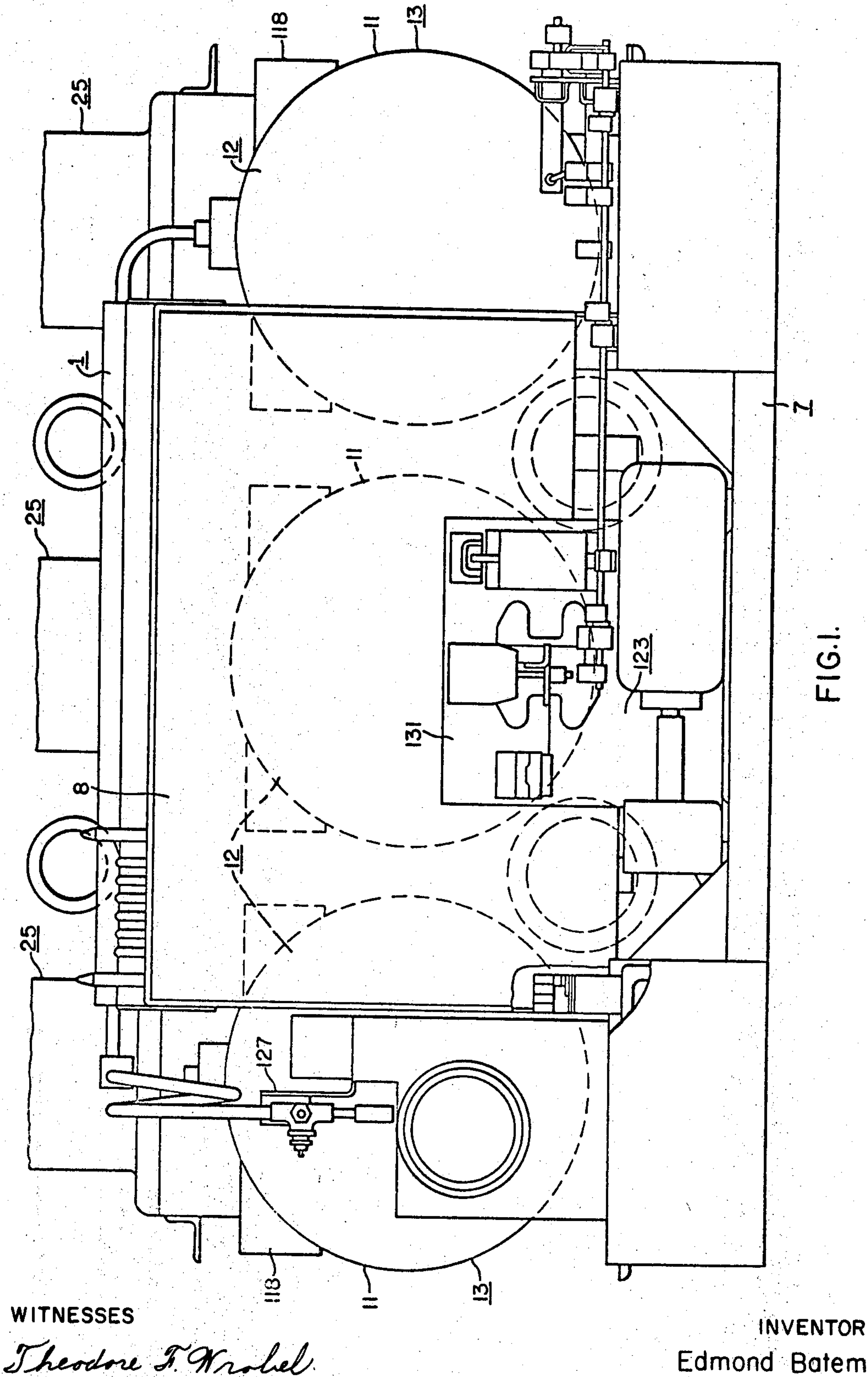
FIG. 1 is an end elevational view of a three-phase truck mounted removable circuit-interrupter unit, involving three individual pole-units
Figure 2:
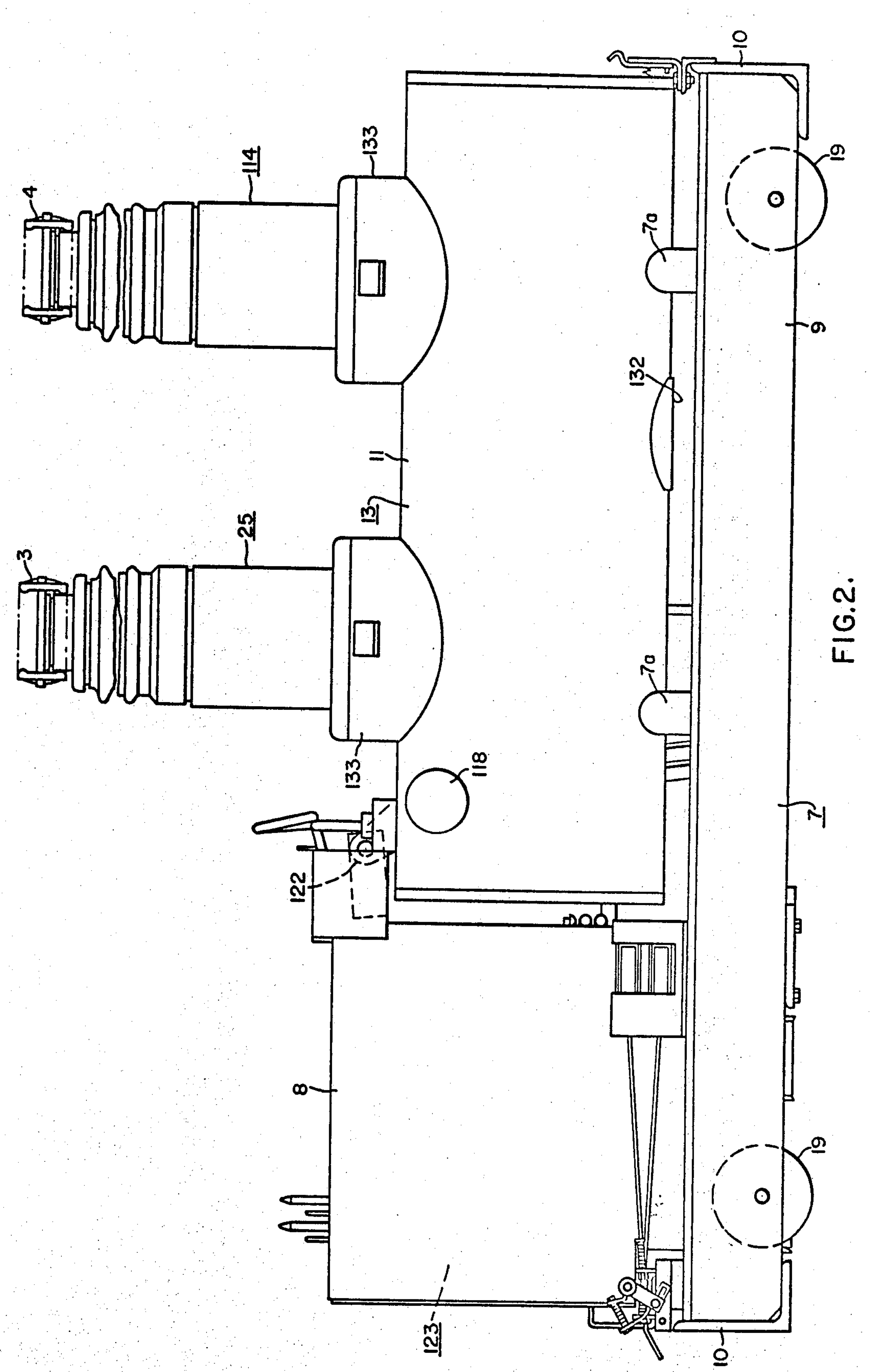
FIG. 2 is a side elevational view of the truck-mounted removable three-phase circuit-interrupting unit illustrated in FIG. 1.

Referring to the drawings, and more particularly to FIGS. 1 and 2 thereof, the reference numeral 1 indicates a three-phase truck-mounted fluid-blast circuit interrupter unit of the type which may be rolled into an associated cell structure. As well known by those skilled in the art, in metal-clad switchgear equipment it is customary to have cells or cubicles, into which are rolled removable interrupting unit equipment 1.

In more detail, with reference to FIG. 2, a frame assembly 7 is provided to support the circuit breaker 1 on support bosses 7*a* welded to the underside of the tanks. The frame assembly 7 is welded up from structural steel sections 9, 10. Rollers 19 are provided to facilitate operative movement into and out of the cooperable cell structure.

In the movable switchgear interrupting equipment 1, set forth in FIGS. 1 and 2, after the equipment is rolled into the associated cubicle structure, suitable means are provided to effect a vertical upward movement of the entire equipment on vertically-movable rails, so that the main movable disconnecting contacts 3, 4 may contactingly engage an associated pair of spaced stationary disconnecting contacts, which are supported by the cubicle, or cell structure.

The present invention is particularly concerned with the interrupting structure of the equipment illustrated in FIGS. 1 and 2. It will be noted that, generally, there is provided an operating-mechanism compartment generally designated by the reference numeral 8, and three heavy metallic tanks 11, which enclose the respective interrupting elements 12 associated with each pole-unit 13. Disposed within each of the three tank structures 11 is the interrupting assembly, generally designated by the reference numeral 12, and comprising a stationary insulating operating cylinder 14 having one end 15 thereof open, and having the other end 16 thereof closed by a base portion 17, the latter including a stationary accelerating coil 18 embedded in a suitable plastic 21, for example, epoxy resin.

Figures 21, 22, 23:
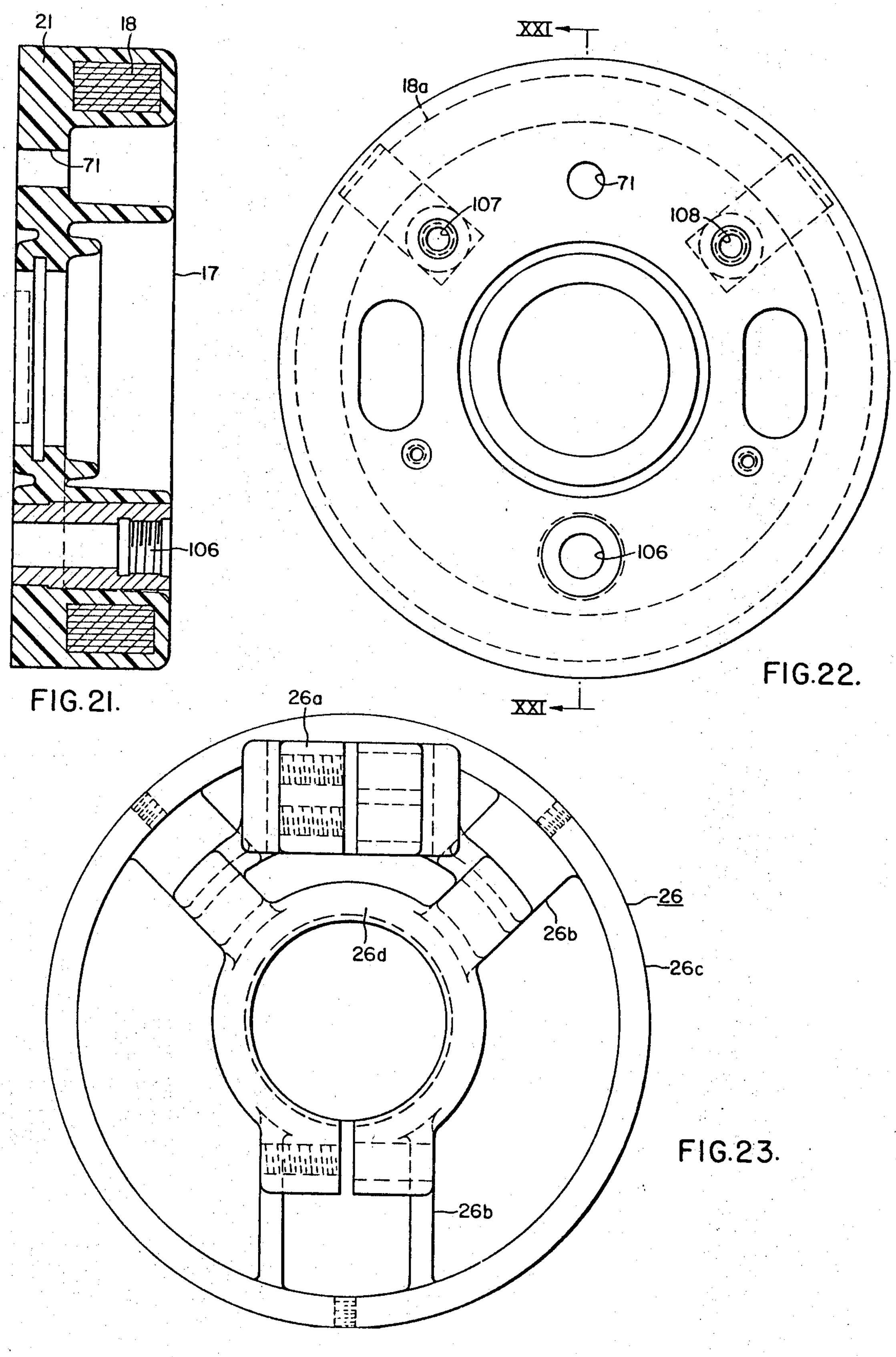
FIGS. 21 and 22 illustrate, respectively, in vertical section, and in end elevation, the stationary accelerating cylinder-head coil, which is fixedly secured in the end of the operating cylinder to close the same at one end.
FIG. 23 is an end elevational view of the stationary conducting supporting casting, which is clamped to the terminal stud of the front terminal bushing.

The front end 14*a* of the stationary operating cylinder 14 is supported, as by bolted connections, to four bosses 22 (FIG. 4), the latter being welded interiorly of the tank structure 11. Extending downwardly through an opening 23 provided adjacent the front end 14*a* of the stationary operating cylinder 14 is a line-terminal stud 24, which extends upwardly through the front terminal bushing 25 of each pole-unit 13. The terminal stud 24 is clamped to a stationary conducting supporting casting, generally designated by the reference numeral 26, and shown more clearly in FIGS. 3 and 23 of the drawings.

Figure 5:
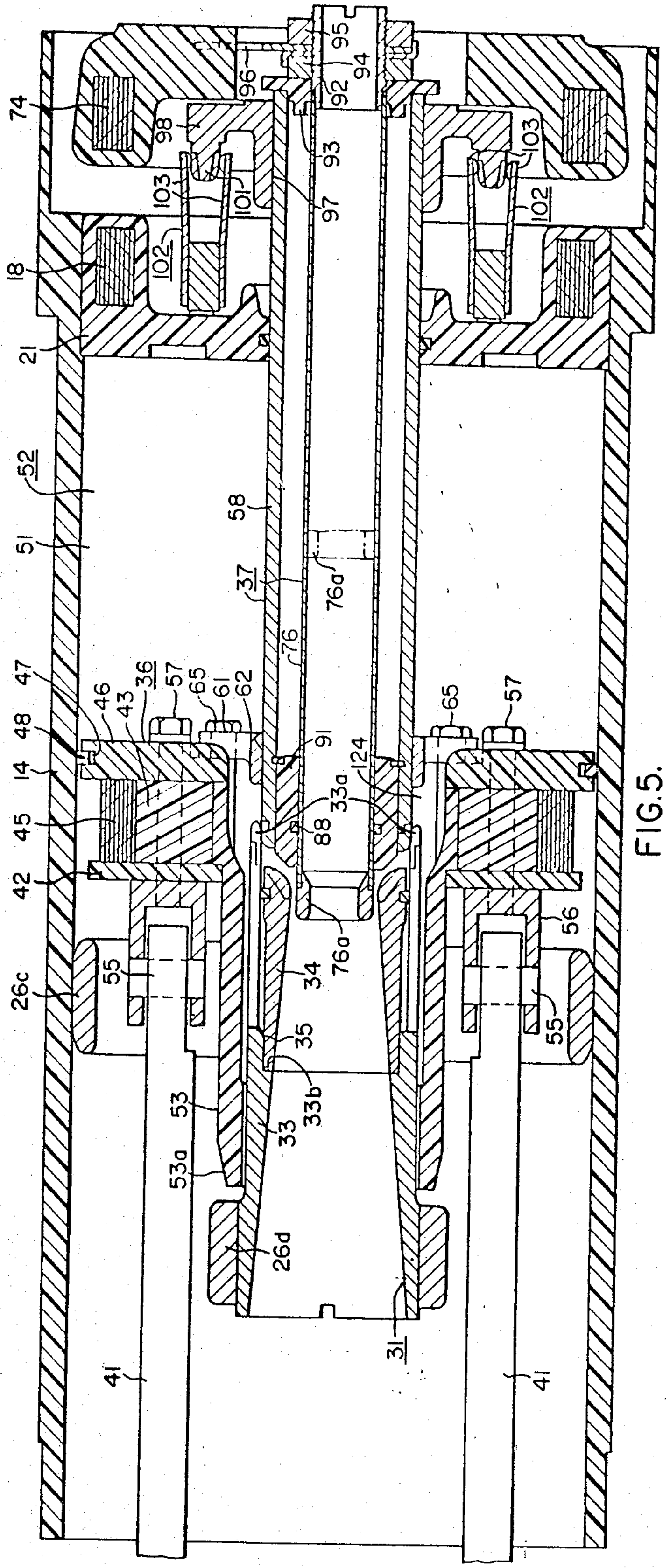
FIG. 5 is a considerably enlarged horizontal sectional view taken through the interrupting element of FIG. 3, substantially along the line V—V of FIG. 3, the contact structure being illustrated in the closed-circuit position.
Figures 9, 10:
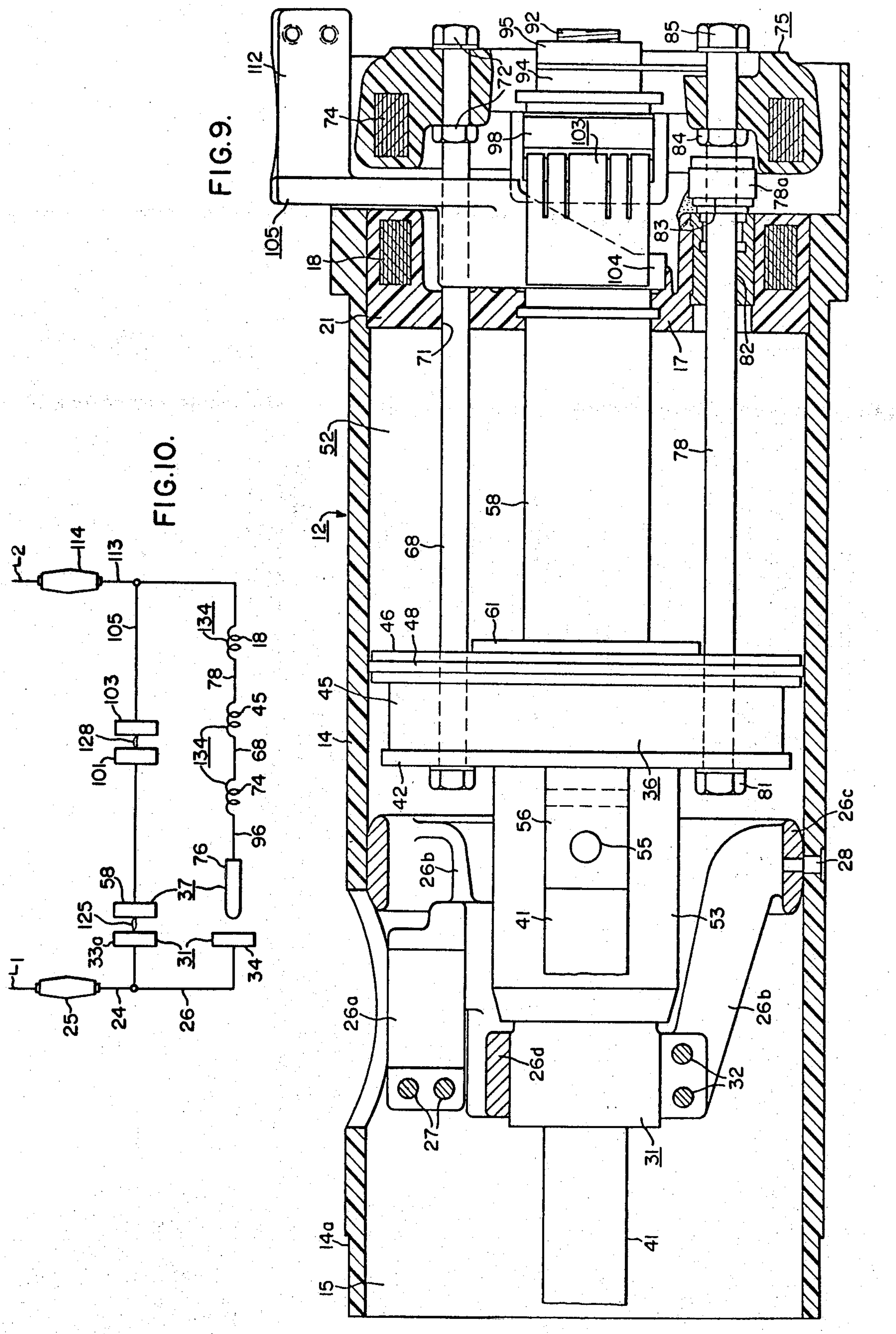
FIG. 9 illustrates a vertical sectional view taken through the improved interrupting element of the present invention, the contact structure being illustrated in the closed-circuit position.
FIG. 10 is a diagrammatic view illustrating the accelerating coils with their connections to the contact structure.

With reference to FIGS. 5 and 9 of the drawings, it will be noted that the stationary support casting 26 has a clamping portion 26*a* of bifurcated construction, which clamps by volts 27 to the lower interior end of the terminal stud 24 extending through the front terminal bushing 25 of the device. In addition, the stationary casting 26 has a spider portion 26*b* with an integrally-formed support ring 26*c*, which is bolted, as a 28 (FIG. 9), to the stationary operating cylinder 14. Moreover, the stationary conducting casting 26 has a threaded supporting portion 26*d*, which adjustably threadedly secures a stationary contact assembly, generally designated by the reference numeral 31. With reference to FIG. 9, it will be observed that once the proper adjustment of the stationary contact structure 31 is obtained, clamping bolts 32 may be tightened, and the structure is then rigid.

As shown in more detail in FIGS. 5 and 9 of the drawings, the main stationary contact assembly 31 comprises a main stationary contact 33 of generally tubular configuration and having a plurality of flexible main contact fingers 33*a* formed at the right-hand end thereof. Disposed interiorly of the tubular main contact structure 33 is a conducting metallic arcing nozzle member 34, which is fixedly secured, as by brazing at 35, to the interior of the outer main contact tube 33 up against a shoulder portion 33*b* thereof. Both the main flexible contact fingers 31*a* and the nozzle arcing member 34 have arc-resisting tip portions of a suitable arc resistant metal, such as copper-tungsten or silver-tungsten alloys.

Movable lengthwise of the stationary operating cylinder 14 is a movable piston assembly 36 carrying a movable contact structure 37. As shown more clearly in FIGS. 3 and 5 of the drawings, a pair of insulating operating links 41 cause the rightward opening movement of the movable piston assembly 36 carrying therewith the movable contact structure 37.

Figure 25:
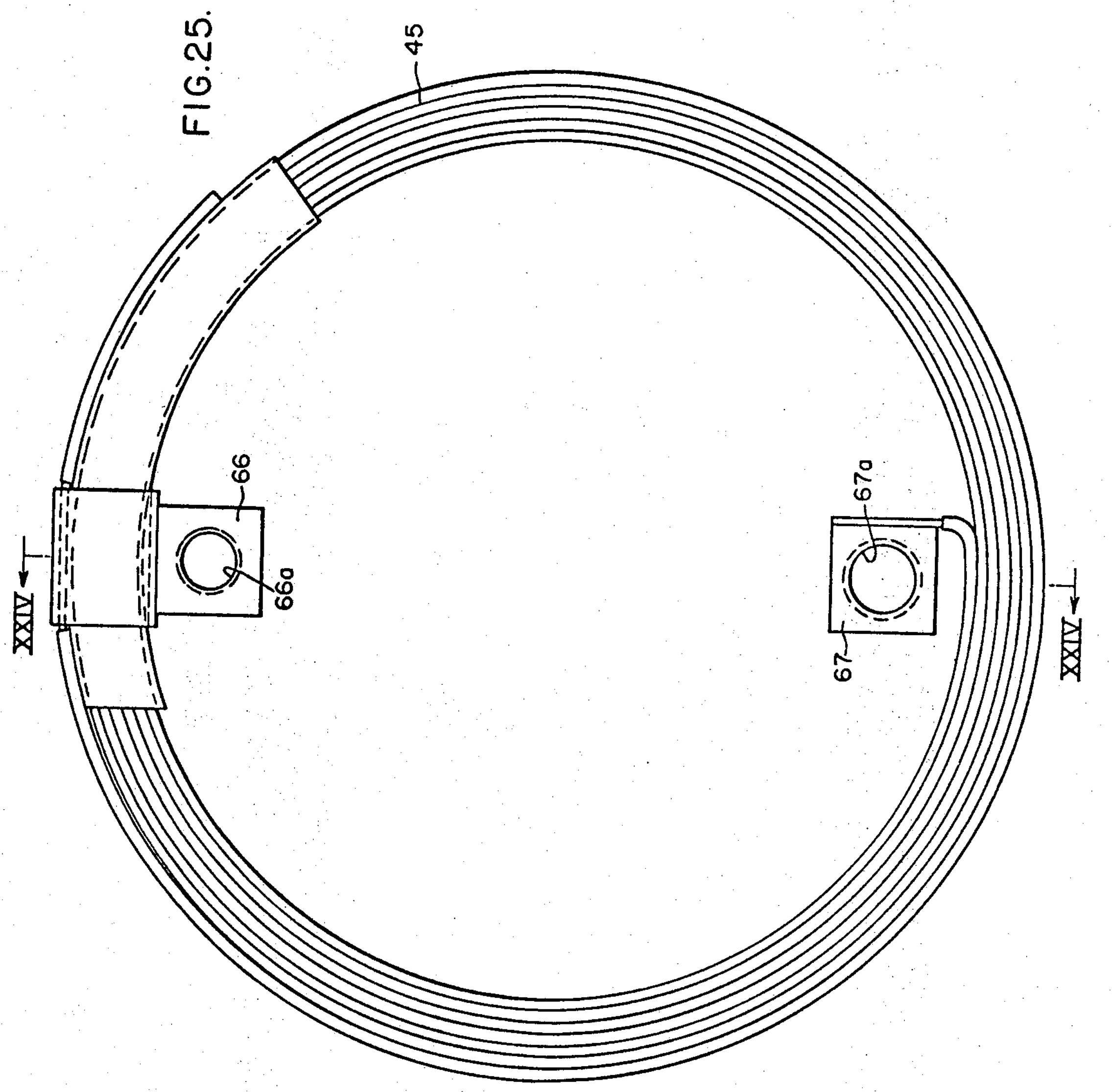
FIGS. 24 and 25 are, respectively, vertical sectional views and end elevational views of the piston accelerating coil.
Figure 24:
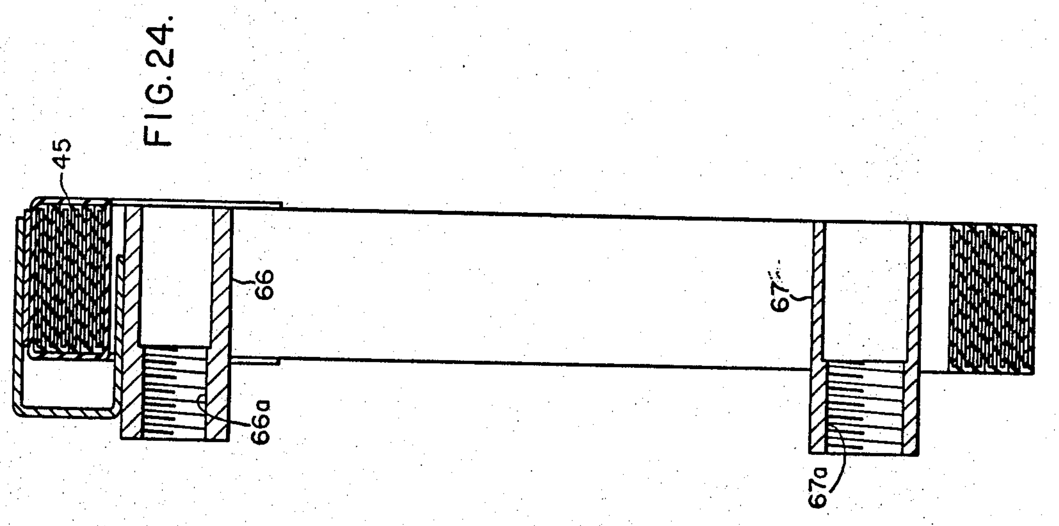

The movable piston assembly 36 includes an annular insulating clamping plate 42 (FIG. 30), an annular insulating spacing plate 43 having notches 44 provided therein, as shown in more detail in FIG. 29 to accommodate a moving accelerating piston coil 45 shown in FIGS. 24 and 25. In addition, the moving piston assembly 36 includes an insulating annular piston plate 46 (FIG. 28) having an outer peripheral groove 47, in which a piston ring 48 is inserted to prevent the escape of compressed gas 51 out of the region 52 of the piston assembly 36. As mentioned previously, the right-hand base end 16 of the operating cylinder 14 is closed by the annular head 17. As a result, gas within the region 52 is compressed, and is forced to flow in a leftward direction through a movable insulating nozzle member 53, which is clamped between the two insulating plates 42, 46 and interiorly of the insulating spacing member 43.

Figure 8:
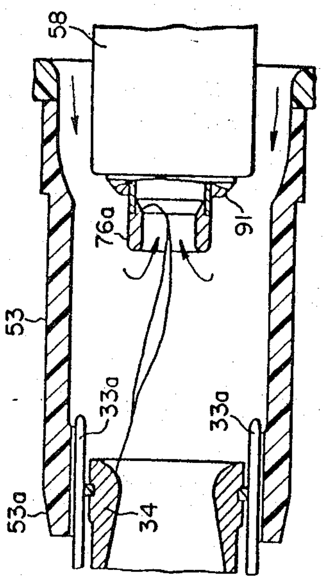
FIG. 8 is a fragmentary view, similar to that of FIGS. 6 and 7, but showing the contact structure in the position at which the transferred arc is about to be interrupted.
Figure 7:
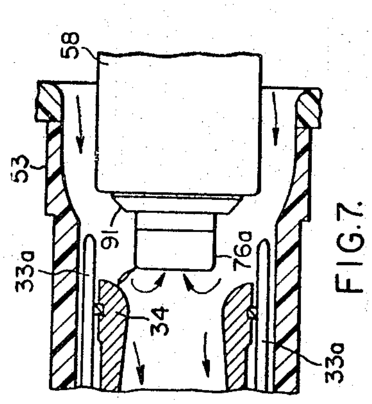
FIG. 7 is a view similar to that of FIG. 6, but showing the main-current arc as having transferred to the movable arcing contact.
Figure 6:
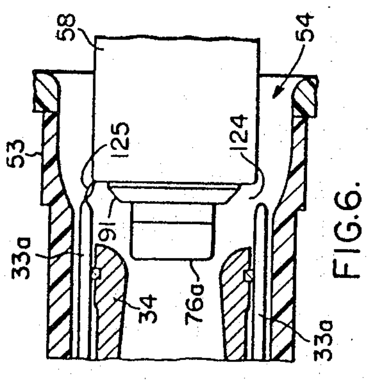
FIG. 6 is a fragmentary view of a portion of the contact structure illustrating the establishment of the main-current arc during the initial portion of the circuit-opening operation.

The left-hand end 53*a* of the movable nozzle member 53 constantly slides upon the outer surface of the main tubular contact 33, and assists the guiding motion of the piston assembly 36, as well as providing the desired flow for the compressed gas past the separable contact structure 31, 37. FIGS. 6–8 generally show the flow path for the compressed fluid 51, as indicated by the arrows 54.

Figure 12:
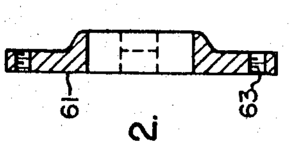
FIGS. 11 and 12 show, respectively, in plan, and in vertical section, the supporting spider member secured to the main movable contact tube.
Figure 11:
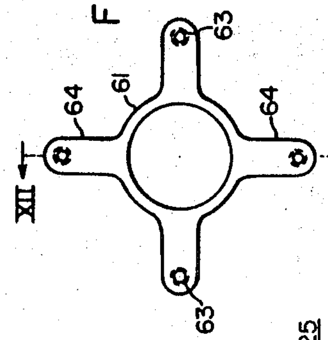

As shown in more detail in FIG. 5 of the drawings, the insulating links 41 have pivotal connections, by means of pivot pins 55, to bifurcated members 56, the latter being bolted by bolts 57 extending through the three insulating members 42, 43 and 46. In addition, with reference to FIGS. 11, 12 and 5, it will be noted that the main tubular movable contact 58 has a supporting spider 61 (FIGS. 11 and 12) fixedly secured thereto, as by brazing at 62, and the support spider 61 has holes 63 in the radially outwardly-extending arms 64 thereof, through which extend supporting bolts 65, which additionally clamp the insulating plates 42, 43 and 46 together.

The movable accelerating coil 45 has a configuration more clearly shown in FIGS. 24 and 25, and has a pair of terminal lugs 66, 67 having threaded openings 66*a*, 67*a* therethrough. The accelerating coil 45 is wound of heavy copper strap, for example, with the outer terminal lug 66 thereof electrically and mechanically connected to an upper conducting guide and piston rod 68, which extends through an aperture 71 in the cylinder head 17, and is electrically connected, by a bolted connected 72 (FIG. 20), to one terminal end 73 of a movable repulsion coil 74 encapsulated in a driving unit 75 secured to the right-hand extremity of the movable contact structure 37, comprising the outer tubular main contact tube 58 and an inner arcing tube 76 insulated therefrom.

As will be more fully brought out hereinafter, the two accelerating coils 18, 45 are so wound that they magnetically attract each other, whereas the accelerating coils 18, 74 are so wound as to repel each other. The net result is a magnetically-assisted opening fluid-driving motion of the piston assembly 36, as accelerated by the driving unit 75.

The other terminal 77 of the movable driving repulsion coil 74 is electrically connected to the inner arcing contact 76, which has a tubular configuration, as more clearly illustratrated in FIG. 5.

With reference to FIG. 9 of the drawings, it will be noted that the terminal lug 67 connected to the inner strap of the movable accelerating coil 45 has a threaded connection 67*a* (FIG. 24) to a relatively large conducting guide rod 78, which is bolted to the piston assembly 36 by a nut 81 (FIG. 9) so as to make metal-to-metal contact with terminal 67 of piston coil 45.

The right-hand end 78*a* of the relatively large conducting guide rod 78 extends through an opening 82 provided in the head 17 of the operating cylinder 14, and moves in sliding relationship with a tubular sliding contact 83. This sliding contact construction 83 of ball construction is set forth in detail, and claimed in United States patent application filed Oct. 13, 1965 Ser. No. 495,475, now U.S. Pat. 3,301,986, issued Jan. 31, 1967 to Russell E. Frink, and assigned to the assignee of the instant application.

The right-hand end of the relatively large guide rod 78 is fixedly secured by bolts 84, 85 to an insulated portion 86 (FIG. 20) of the moving driving unit 75. Reference may be had to the diagrammatic view of FIG. 10 for assistance in understanding the electrical connections to the three accelerating coils 18, 45 and 74.

The inner tubular arcing contact 76 has an arc-resisting tip portion 76*a*, which is fixedly secured to the left-hand extremity thereof, as by brazing. Additionally, the tubular arcing contact 76 has a support-ring 88 brazed thereto, which serves to seat a split insulating spacing member 91, which serves to insulate the left-hand end of the inner tubular arcing contact 76 from the outer tubular main contact 58. Also the right-hand end of the inner movable tubular arcing contact 76 has a tubular threaded insert 92 fixedly secured thereto, as by brazing. An insulating washer 93, together with a pair of clamping nuts 94, 95, serves to support the electrical strap connection 96 to the moving driving coil 74 and also to fixedly and insulatingly support the inner arcing tube 76 from the outer main contact tube 58.

Figure 13:
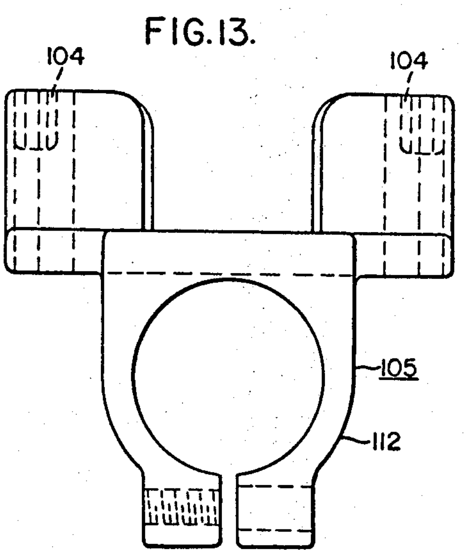
FIGS. 13–15 illustrate views of the supporting rear casting clamp for the rear terminal stud.
Figure 14:
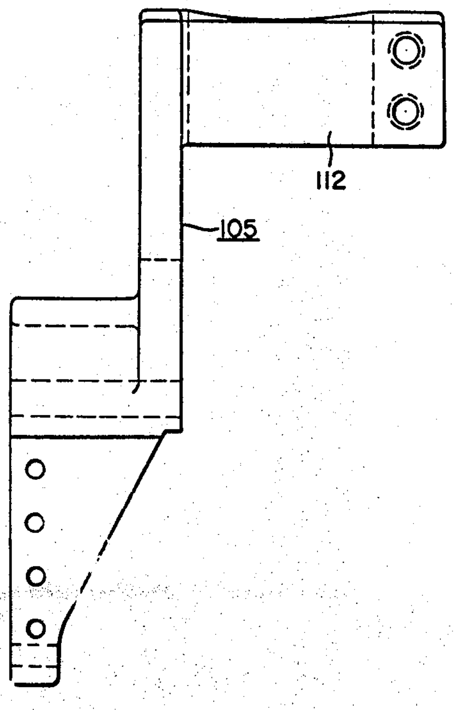
Figure 15:
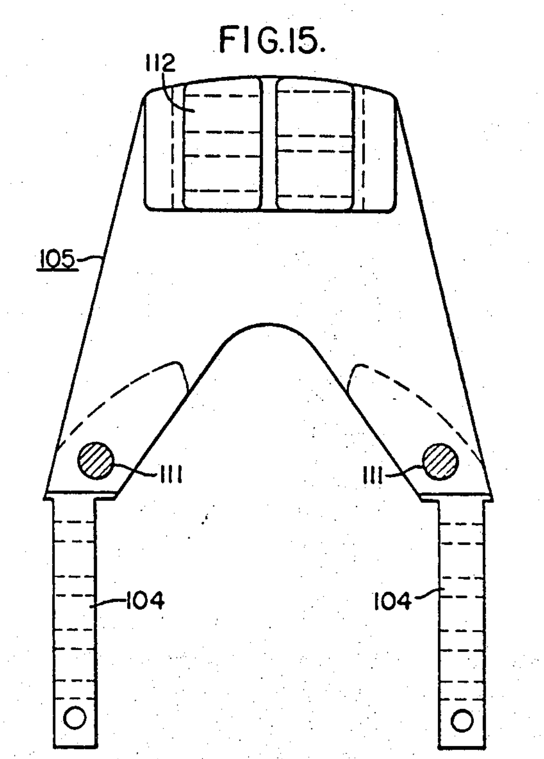

Threadedly secured to the right-hand end of the main contact tube 58, as at 97 is a rear main contact structure, generally designated by the reference numeral 98. The rear movable main contact structure 98 assumes the form of a casting, shown in FIGS. 16 and 17, and has a pair of movable main contacting portions 101, of wedge configuration, which mate with two sets 102 of flexible main contact fingers 103, which are secured to downwardly-extending arms 104 of a rear support casting 105, shown in more detail in FIGS. 13–15 of the drawings.

The stationary accelerating coil 18 has one terminal lug 106 (FIG. 21) thereof, as mentioned, making sliding electrical contact with the lower conducting guide rod 78, and has a pair of terminal lugs 107, 108 electrically connected to the outer strap 18*a* thereof making threaded supporting and electrical connection by a pair of bolts 111 (FIG. 15), which extend through the two mounting holes of the rear supporting casting 105 of the device.

Figure 3:
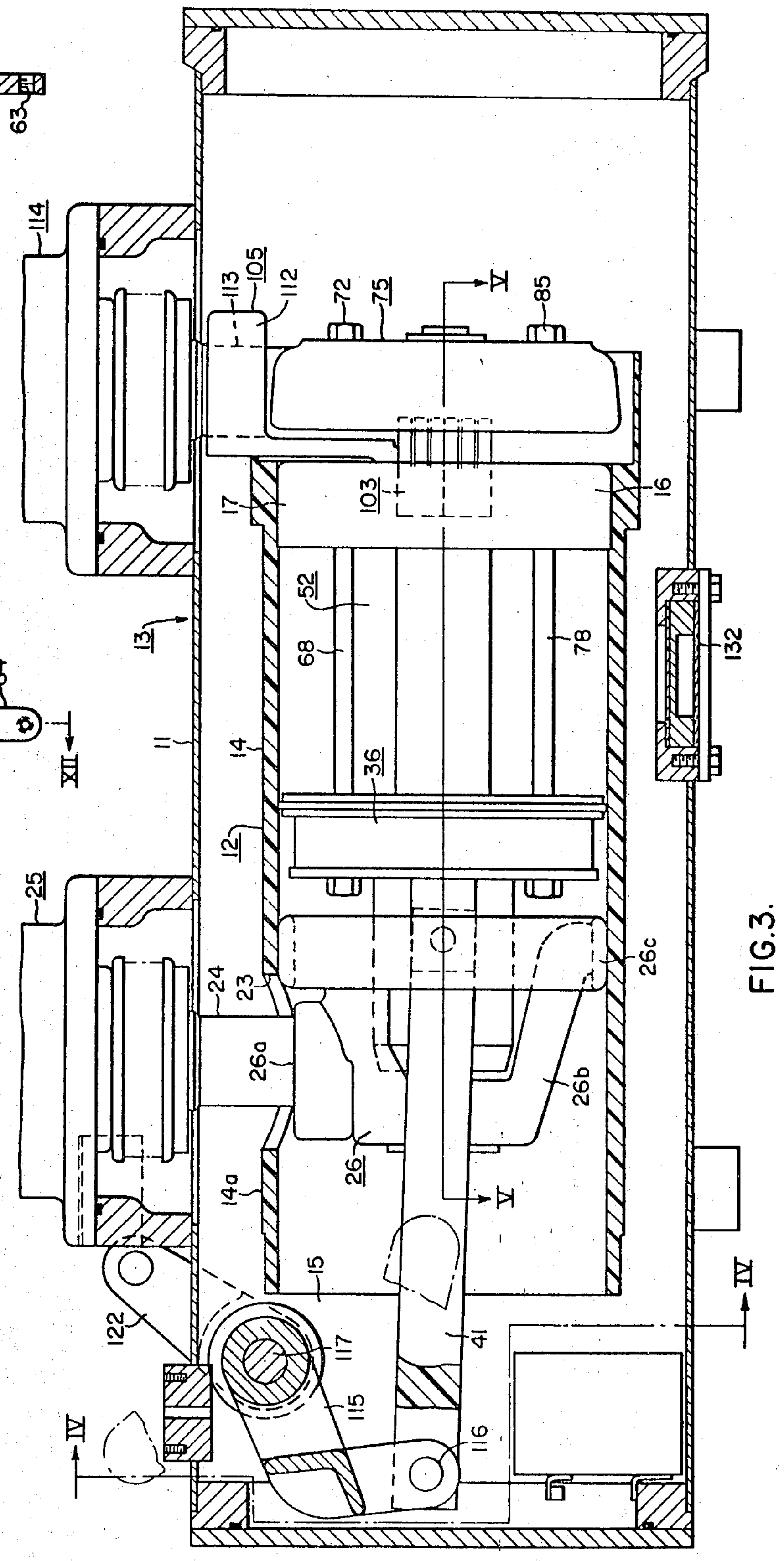
FIG. 3 is a vertical sectional view taken through one of the three pressure tank structures of FIGS. 1 and 2, illustrating the circuit-interrupting element mounted therein, the contact structure being illustrated in the closed-circuit position.

The rear casting 105 has a laterally-extending bifurcated clamping portion 112, which embraces the rear terminal stud 113 extending upwardly through the rear terminal bushing 114 of the interrupting unit 1. As shown in FIG. 3, the rear support casting 105, by securement to the cylinder head 17, serves additionally for the entire support of the right-hand end of the operating cylinder 14, as viewed in FIG. 3.

With reference to FIG. 3 of the drawings, it will be noted that a crank-shaft 115 is pivotally connected, as by means of pivot pins 116, to each of the two insulating operating links 41. The crank-shaft 115 is pinned so as to rotate with a drive-shaft 117, one end of which is journaled in a bearing 118 (FIG. 4) provided internally of the tank structure 11. The other end of the drive-shaft 117 extends through a seal 121 externally of the tank structure, and has welded thereto, at the outer extremity thereof, a crank-arm 122, which is connected to the operating mechanism 123 disposed within the mechanism compartment 8. The operating mechanism 123 may be of any suitable type. Preferably, however, there is employed a spring-stored-energy operating mechanism of the type set forth in United States patent 3,183,332 issued May 11, 1965 to Russell E. Frink and Paul Olson and assigned to the assignee of the instant application.

Figure 4:
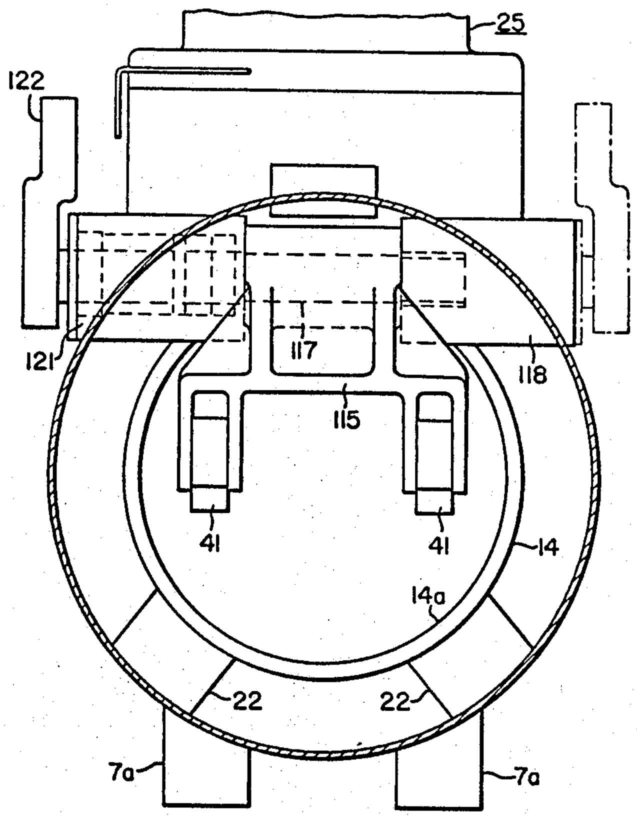
FIG. 4 is a vertical sectional view of the pressure tank taken along the line IV—IV of FIG. 3 looking in the direction of the arrows, the contact structure being illustrated in the closed-circuit position.

With reference to FIGS. 3 and 4 of the drawings, it will be observed that counterclockwise rotative motion of the external crank-arm 122 and drive-shaft 117 will effect rightward opening fluid-driving motion of the piston assembly 36, as viewed in FIGS. 3 and 5. This mechanical movement, as brought about by the operating mechanism 123, causes a flow of compressed gas from the region 52 past the spider 61, and through the orifice opening 124 provided in the insulating nozzle member 53. This gas flow serves to transfer the main-current arc 125, which is initially established between the separable main contacts 33*a*, 58 across the insulating spacer 91 to be carried to a position illustrated in FIGS. 7 and 8 of the drawings. Since the rightward opening movement of the piston assembly 36 also causes separation of the rear movable main contacts 101 away from the rear stationary main contacts 103, there occurs two breaks in the electrical circuit, as illustrated in FIG. 10 of the drawings. Since the arc voltage at the two breaks builds up, and since the resistance through the parallel circuit, including the accelerating coils 18, 45 and 74, offers less impedance, the arc 125 transfers to the separable arcing contacts 34, 76, and thereby inserts the three accelerating coils serially into the electrical circuit. FIG. 8 illustrates the arc location at the time when the accelerating coils are in series circuit, and at a time when the gas flow is about to effect final arc extinction. Continued opening movement inserts an isolating gap into the circuit, as indicated by the dotted lines 126 in FIG. 5.

From the foregoing description, it will be observed that there is provided a piston coil 45, a stationary coil 18, and a moving repulsion coil 74, all of which are inserted electrically into the circuit by an interrupting break and an auxiliary break, with reference being had to FIG. 10 in this connection.

Certain broad features of the electromagnetic means which is used in the present invention are set forth and claimed in United States patent application, filed Sept. 1, 1966, Ser. No. 576,616 by Russell E. Frink, and assigned to the assignee of the instant invention. Additionally, certain features of the contact and nozzle construction is set forth and claimed in United States patent application, filed Sept. 1, 1966, Ser. No. 576,711 by Robert M. Roidt, and assigned to the same assignee. The concept of having opposite venting through both the stationary contact structure and the movable tubular arcing contact to maintain the arc terminals thereon is set forth and claimed in United States patent application filed Sept. 1, 1966, Ser. No. 576,-583 by William H. Fischer, and assigned to the assignee of the instant application. The broad concept of using an arcing horn to insert the accelerating coils 18, 45 and 74 into the circuit is set forth and claimed in United States patent application filed Sept. 1, 1966, Ser. No. 576,739 by Russell E. Frink, and assigned to the assignee of the instant application.

Although various suitable arc-extinguishing fluids may be used, it is preferred to use a highly-efficient arc-extinguishing gas, such as sulfur-hexafluoride ($SF_6$) gas, at a pressure of say 75 p.s.i., for example. Suitable gas-pressure measuring equipment 127 (FIG. 1) is provided within the mechanism compartment 8, so that an alarm circuit may be actuated upon an unduly low-pressure decrease within the tanks. However, the circuit interrupter may lose down to 40 p.s.i. before difficulty is encountered.

OPENING OPERATION

When the circuit interrupter unit 1 is closed, the current path is from the front terminal bushing 25, to the front support casting 26, to the tubular stationary contact 33, to the tubular moving contact 58, to the T-shaped support member 98, to the rear auxiliary contact fingers 103, to the rear terminal casting 105, and to the rear terminal bushing 114.

When the circuit breaker is opened, the movable piston assembly 36 is moved to the right by the operating mechanism 123, compressing the gas within the operating cylinder 14, and drawing arcs 125, 128 between the left-hand main contacts 33*a*, 58 and between the T-shaped member 98 and the contact fingers 103 on the right-hand end of the interrupting element 12. These arcs are paralleled by the three accelerating coils 18, 45, and 74 and since the three accelerating coils form a lower impedance path, the current quickly transfers to the accelerating coils. The current path is now from the stationary arcing contact 34 to the moving tubular arcing contact 76, through the strap connector 96 at the right to the "driver" coil, 74 to the upper guide rod 68, to the piston coil 45, to the lower guide rod 78, to the sliding ball contact 83, to the cylinder coil 18 and to the rear terminal casting 105. The three coils are wound so that the piston coil 45 is attracted by the cylinder coil 18, and the "driver" coil 74 is repelled by it. This magnetic action provides a powerful "assist" to the moving piston 46 in driving gas through the main arc 125 and accomplishing its interruption. Tests show that for a maximum fault level, approximately 10% of the driving energy is supplied by the operating mechanism 123, and 90% by the accelerating coils 18, 45 and 74.

The following table indicates the remarkable interrupting performance of a three-phase model. Tests were made at 38 kv. and 22 kv., and with an ungrounded neutral, and at maximum settings.

| | Test voltage, kv. | Int. Currents-Sym. | | | Int. Currents-flsym. | | | Int., time cycles |
|---|---|---|---|---|---|---|---|---|
| | | φ1 | φ2 | φ3 | φ1 | φ2 | φ3 | |
| Test No.: | | | | | | | | |
| 2-50244AL | 38 | 1,050 | 1,065 | 990 | 1,170 | 1,275 | 1,050 | 2.70 |
| 2-50244AM | 38 | 1,050 | 1,080 | 975 | 1,050 | 1,200 | 1,200 | 2.20 |
| 2-50244AN | 38 | 2,100 | 2,130 | 1,980 | 2,130 | 2,480 | 2,580 | 2.60 |
| 2-50244AO | 38 | 4,300 | 4,300 | 4,050 | 4,300 | 5,150 | 5,150 | 2.55 |
| 2-50244AP | 38 | 8,420 | 8,500 | 8,100 | 8,500 | 9,820 | 9,900 | 2.55 |
| 2-50244AQ | 38 | 12,150 | 12,000 | 11,550 | 12,150 | 13,950 | 13,050 | 2.57 |
| 2-50244AR | No Test, Breaker not tripped | | | | | | | |
| 2-50244AS | 28 | 11,550 | 11,700 | 11,550 | 12,450 | 12,150 | 13,650 | 2.60 |
| 2-50244AT | 38 | 13,500 | 19,000 | 12,250 | 14,000 | 19,350 | 13,750 | 2.65 |
| 2-50244AU | 38 | 18,500 | 16,500 | 18,250 | 20,000 | 19,500 | 20,750 | 2.63 |
| 2-50244AV | 38 | 22,350 | 21,500 | 21,500 | 25,000 | 22,000 | 25,000 | 2.62 |
| 2-50244AW | 38 | 24,200 | 23,750 | 22,750 | 26,200 | 24,500 | 30,250 | 2.70 |
| 2-50244AX | No Load Timing Test | | | | | | | |
| 2-50244AY | 22 | 1,740 | 1,830 | 1,710 | 1,860 | 1,830 | 2,550 | 2.18 |
| 2-50244AZ | 22 | 7,900 | 8,100 | 7,800 | 11,380 | 8,320 | 10,000 | 3.20 |
| 2-50244BA | 22 | 1,710 | 1,860 | 1,710 | 2,700 | 1,890 | 2,400 | 2.15 |
| 2-50244BB | 22 | 7,900 | 8,000 | 7,820 | 11,400 | 8,300 | 9,980 | 3.05 |
| 2-50244BC | 22 | 15,800 | 16,550 | 15,800 | 23,150 | 17,200 | 19,300 | 2.55 |
| 2-50244BD | 22 | 23,100 | 23,900 | 23,100 | 30,600 | 24,000 | 27,900 | 3.18 |
| 2-50244BE | 22 | 25,900 | 26,700 | 25,900 | 30,900 | 27,000 | 30,000 | 2.95 |
| 2-50244BF | 22 | 28,000 | 29,700 | 28,800 | 33,000 | 29,700 | 32,900 | 2.55 |
| 2-50244BG | 22 | 32,100 | 32,400 | 32,400 | 39,200 | 32,800 | 35,600 | 2.50 |
| 2-50244BH | 22 | 32,900 | 34,800 | 33,600 | 39,800 | 34,800 | 37,500 | 2.50 |
| 2-50244BI | 22 | 34,400 | 35,600 | 34,800 | 44,000 | 35,600 | 42,000 | 2.55 |
| 2-50244BJ | 22 | 37,300 | 37,800 | 37,400 | 50,400 | 37,800 | 49,300 | 2.68 |

With reference to FIGS. 1 and 2 of the drawings, it will be noted that there is provided a pressure-control panel assembly 131. It consists of a pressure gauge, a filling valve, and a pressure switch. From this assembly there is a manifold connecting to the tanks 11 of the three interrupting pole-units 13. The pressure switch is arranged to provide an alarm if the gas pressure leaks off, the alarm being provided before the lower limit for fault interruption is reached. At the lowest pressure limit, the switch will operate to trip the breaker and lock it out. The switch is temperature compensated.

Each pole-unit assembly 13 includes the grounded metallic tank 11 with a pressure-release rupture disc 132 (FIG. 3) mounted in the bottom of the tank 11. It is placed at the bottom of the tank 11 so that if it operates, the fragments will be directed toward the floor. As shown, the top of each tank 11 has two flanges 133 (FIG. 2) to which the bushings 25, 114 are bolted.

In fluid-blast circuit interrupters of the piston-operated, or "puffer" type, the operating mechanism has, in the past, been required to supply the energy requirements to interrupt high currents. However, pressure in the cylinder from the back-pressure of the arc made the mechanism power, required to drive the piston, so excessive as to make the designs uneconomical. The interrupting assembly of the present invention, which has been described above, uses coils of 6½ turns each, creating approximately 90% of its driving energy by a magnetic interaction of the accelerating coils when interrupting currents of the order of 40,000 amperes. A three-phase model has, in fact, interrupted over 50,000 amperes, and this was not its limit.

In addition to the basic interrupting ability of the puffer-type circuit interrupter described above, there are several other advantages to this type of interrupter. First of all, since the interruption is in an atmosphere of $SF_6$ gas, there is complete freedom from fire hazard. Secondly, since the interruption takes place inside a sealed pressure vessel, there is virtually no interruption noise. As described above, the contacts for the breaker operate in a sealed chamber filled with sulfur-hexafluoride ($SF_6$) gas at 75 p.s.i. for example. A separate chamber is provided for each phase, and the piston, magnetically driven by the fault current in the circuit, forces the high velocity stream of gas through the arc stream and extinguishes the arc in 1½ cycles, or less. Experience has indicated that there is little or no decrease in interrupting ability down to 30 p.s.i. gas pressure. At atmospheric pressure, the breaker will maintain its insulation value and will safely interrupt load currents at rated voltage. Sulfur-hexafluoride ($SF_6$) gas has proved to be remarkably inert, with excellent interrupting and insulating properties. Chemically, $SF_6$ gas is one of the most claimed in U.S. patent applications filed Sept. 1, 1966, Ser. Nos. 576,740 and 595,889 service conditions, is inert, non-flammable, non-toxic and odorless.

As pointed out above, the interruption takes place in $SF_6$ gas, stored under pressure in a metal tank. Gas flow for interruption is provided by the magnetically-assisted piston, and no separate tanks, external piping compressors, or blast valves are required. Also, with the $SF_6$ gas at a nominal pressure of 75 p.s.i. the gas does not liquify at the temperatures that will be experienced in operation, and there is no need for auxiliary heaters. Experience has shown that there is little deterioration of the gas with repeated interruptions, which eliminates the need for its reconditioning, as would be necessary with oil as the interrupting medium.

Internal insulation is furnished by the $SF_6$ gas, with sufficient striking distances to withstand operating voltage at atmospheric pressure. The gas also insulates the bushings.

From the foregoing description it will be apparent that there has been illustrated and described a novel fluid-blast circuit interrupter utilizing electromagnetic means, including at least three accelerating coils, to speed up the piston motion on heavy, or fault-current interruption by attractive and repulsive forces. By so doing, the energy requirements of the operating mechanism 123 may be minimized. In addition, the use of such electromagnetic means 134 (FIG. 10) has enabled the compression of the required gas flow to be obtained in a minimum of time. Finally, the several elements of the interrupting assembly 12 have been positioned and interrelated in a compact and closely-spaced arrangement, so that all three pole-units 13 may be operated from the same operation mechanism 123.

Certain features of the described structure are claimed in U.S. patent application filed Sept. 1, 1966, Ser. No. 576,740 by Russell E. Frink and William H. Fischer and assigned to the assignee of the instant application.

Although there has been illustrated and described a specific structure, it is to be clearly understood that the same was merely for the purpose of illustration, and that changes and modifications may readily be made therein by those siklled in the art, without departing from the spirit and scope of the invention.

I claim as my invention:

1. A fluid-blast circuit interrupter including separable contact structure separable to establish arcing, piston means for compressing fluid including a movable piston operable within a relatively stationary operating cylinder, nozzle means for directing said compressed fluid against the arc, three series-connected accelerating coils, transfer means for elecrtically inserting said three coils serially into the electrical circuit being interrupted, a first accelerating coil carried by said movable piston, said relatively stationary operating cylinder having a stationary head portion for closing one end of the operating cylinder, said staitonary head portion carrying a stationary second accelerating coil so wound as to attract the said first accelerating coil when the two coils are electrically inserted into the electrical circuit being interrupted, a third accelerating coil so wound as to repel one of the first-mentioned two coils when the coils are electrically inserted into the electrical circuit being interrupted, whereby the attractive and repulsive magnetic forces of the three coils will assist in the mechanical operation of the movable piston.

2. The fluid-blast circuit interrupter according to claim 1, wherein an operating mechanism is provided to mechanically effect piston movement during low-current interruption, and said transfer means includes two movable contacts one a main contact and the other an arcing contact insulated from the main contact, and said three accelerating coils are electrically connected in series with the movable arcing contact.

3. The combination according to claim 2, wherein the fluid pressure created by the initial compressing stroke of the movable piston is used to assist arc transfer from the movable main contact to the movable arcing contact to thereby electrically insert the three accelerating coils into the electrical circuit being interrupted.

4. The combination according to claim 3, wherein the nozzle means comprises a movable nozzle member carried by the movable piston and assists in directing compressed fluid to effect arc transfer.

5. The combination according to claim 1, wherein the said third accelerating coil is so wound that its resultant magnetic poles are opposite to those of the stationary accelerating coil in the head portion of the operating cylinder.

6. A fluid-blast circuit interrupter including separable contact structure including movable main and movable arcing contacts, said separable contact structure being separable to establish arcing, piston means for compressing fluid including a relatively movable piston and operating cylinder, transfer means to transfer the initially-established arc from the movable main contact to the movable arcing contact, means for directing fluid compressed by operation of said piston means into the arc terminating at the movable arcing contact to effect the extinction thereof, electromagnetic means including three accelerating coils inserted electrically in series into the circuit being interrupted to expedite operation of said piston means durng heavy fault-current interruption, two of said three accelerating coils so wound as to magnetically attract each other, and the third accelerating coil so wound as to have magnetic poles opposite from one of said two accelerating coils, whereby attractive and repulsive magnetic forces are generated to assist the mechanical movement of the piston means.

7. The combination according to claim 6, wherein one of said two accelerating coils is carried by a movable piston and the other is disposed at the stationary head portion of a stationary operating cylinder, within which the movable piston reciprocally moves.

References Cited

UNITED STATES PATENTS

| | | | |
|---|---|---|---|
| 2,503,243 | 4/1950 | Cohen | 335—148 |
| 2,930,870 | 3/1960 | Baer | 335—186 X |
| 2,933,575 | 4/1960 | Baker. | |
| 3,238,340 | 3/1966 | Lerch. | |
| 3,315,056 | 4/1967 | Furakawa et al. | 335—18 X |

FOREIGN PATENTS

| | | |
|---|---|---|
| 514,359 | 1/1938 | Great Britain. |
| 1,142,201 | 1/1963 | Germany. |
| 1,206,056 | 12/1965 | Germany. |

ROBERT K. SCHAEFER, Primary Examiner

R. A. VANDERHYE, Assistant Examiner

U.S. Cl. X.R.

335—148, 177, 201